United States Patent
Folkertsma

(10) Patent No.: US 6,553,898 B2
(45) Date of Patent: Apr. 29, 2003

(54) COOKING TONGS

(76) Inventor: John Folkertsma, 6878 Rix Dr., SE., Ada, MI (US) 49301

( * ) Notice: Subject to any disclaimer, the term of this patent is extended or adjusted under 35 U.S.C. 154(b) by 0 days.

(21) Appl. No.: 09/997,187

(22) Filed: Nov. 29, 2001

(65) Prior Publication Data

US 2002/0063434 A1 May 30, 2002

Related U.S. Application Data

(60) Provisional application No. 60/250,341, filed on Nov. 30, 2000.

(51) Int. Cl.$^7$ ................................................ A47J 43/18
(52) U.S. Cl. ............................................ 99/426; 99/394
(58) Field of Search ................................ 294/15, 16, 7, 294/9, 10; 99/349–351, 394, 419, 421 A, 426, 439, 441, 644

(56) References Cited

U.S. PATENT DOCUMENTS

| | | | | |
|---|---|---|---|---|
| 1,945,165 A | * | 1/1934 | Smith | 452/185 |
| 2,317,388 A | * | 4/1943 | Lako, Jr. | 99/339 |
| 3,181,453 A | * | 5/1965 | Moran | 99/349 |
| 4,625,634 A | * | 12/1986 | Kruper | 99/402 |
| 4,844,525 A | | 7/1989 | Tarlow et al. | |
| 4,955,971 A | | 9/1990 | Goulter | |
| 5,158,009 A | * | 10/1992 | Stewart | 211/181.1 |
| D341,065 S | | 11/1993 | Martner | |
| D364,783 S | | 12/1995 | Weber | |
| 5,934,721 A | | 8/1999 | Walde | |

* cited by examiner

*Primary Examiner*—Dean J. Kramer
(74) *Attorney, Agent, or Firm*—Baker & Daniels

(57) ABSTRACT

A barbecue cooking tool with a pair of hand holdable implements. The implements are configured so as to be capable to firmly hold an entire rack of ribs therebetween during a barbecue grilling process without the ribs separating and falling apart. The tool also includes a clasping mechanism for holding the implements together about the ribs. In one embodiment, the implements of the barbecue cooking tool are separable from one another during normal use and include a first implement and an second implement. Both of the implements have spaced apart rods. The spaced apart rods of the first implement are connected by a connecting rod at one end and by a raised portion on the other end. The spaced rods of the second implement are connected by rounded portions at both ends thereof. The clasping mechanism includes one rounded end of the second implement inserted beneath the raised portion of the first implement. The other end of the second implement is also insertable beneath the connecting rod of the first implement as the implements are being forced by a food item therebetween in this embodiment.

19 Claims, 4 Drawing Sheets

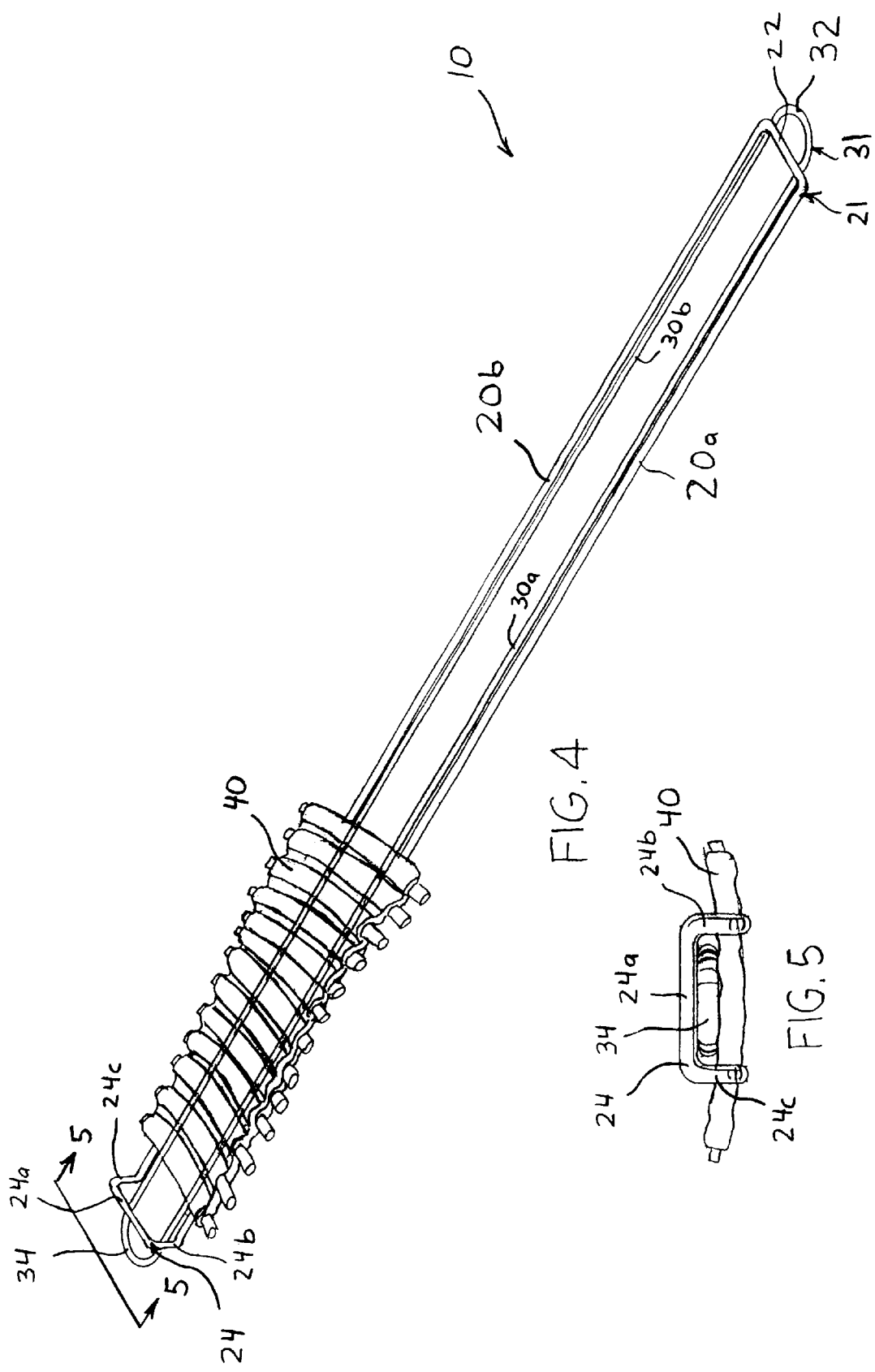

COOKING TONGS

BACKGROUND OF THE INVENTION

The present invention relates to a barbecue cooking tool or tongs, and in particular, to barbecue cooking tongs for holding an entire rack of ribs.

DESCRIPTION OF THE PRIOR ART

Barbecuing or char/open flame grilling has been a long standing favorite for cooking and preparing food and continues to grow in popularity. A feature of barbecuing is that the cooking process tends to include a lot of involvement by the barbecue cook for such tasks as turning the food, seasoning, extinguishing grease fires, adjusting the height of the grilling surface, and/or rearranging the location of the food items on the grill for even cooking. To assist in these tasks, a variety of cooking tools have been developed.

Some of these cooking tools are well known and have been in use for a long time such as spatulas, barbecue forks, and hinged or connected tongs for grabbing food products. Also, a number of variations of these basic tools have been developed. For instance, U.S. Pat. No. Des. 364,783, to J. Weber, incorporated herein by reference, discloses an ornamental design for barbecue tongs wherein one arm of the tongs includes a spatula and the other end includes a barbecue fork. Another barbecue tong assembly is disclosed in U.S. Pat. No. 5,934,721 to A. Walde, incorporated herein by reference. One arm of the Walde assembly includes a standard spatula and the other arm has a spatula including degreasing apertures and tines on the end thereof. The tines facilitate sliding the spatula between the grating wires of a barbecue grill and beneath the food items cooking thereon. The Walde tong assembly also includes an adjustable limiting bolt to hold the spatulas closer together for ease of use and to also prevent excessive separation.

Another prior art barbecue tool is shown in U.S. Pat. No. 4,955,971 to V. Goulter, incorporated herein by reference. As with Weber above, Goulter discloses a pair of barbecue tongs having a spatula on one arm and a fork on the other. The tongs in Goulter include a parallelogram arrangement coupling the two arms. The parallelogram arrangement allows the arms to be swung forward relative to one another. In this manner, the end of the tong having the fork can be swung forward of the spatula enabling better use of the fork, or likewise, the spatula can be swung forward of the fork to allow better use of the spatula. The parallelograms can also be swung such that the fork end and spatula end are even with one another for best use of the tool as a tong for grabbing food between the fork and the spatula of the two arms. A wing nut is attached to one of the pivots of the parallelogram for tightening the tool in a desired position. To change the arrangement of the arms, the wing nut can be loosened, the parallelogram swung as desired and the nut re-tightened.

In U.S. Pat. No. 4,844,525 to Tarlow et al., herein incorporated by reference, another barbecue tool is taught. The tool in Tarlow includes a spatula that also serves as a fork as it has flat tined ends. Also included in the Tarlow design is a movable plate for holding food on the spatula. The end of the tool opposite the spatula includes a handle with a trigger mechanism. Pulling the trigger mechanism moves the plate down to the spatula for holding the food thereon. The trigger mechanism is spring loaded so that release of the trigger will move the plate away from the spatula thereby releasing the food item held between the plate and spatula.

The above barbecue tools work well when cooking small food items such as hamburgers and hotdogs; however, there is no prior art barbecue tool which is ideally suited to aid in cooking a rack or slab of ribs, which typically include a number of substantially parallel rib bones held together by interlocking rib meat or tissue. Barbecued ribs are a favored entree and, as with other barbecued items, continue to increase in popularity. One of the best ways to prepare barbecued ribs is to precook them by baking, steaming or other means before the final barbecuing process on the grill. The precooking assures that the ribs are cooked through thoroughly and tenderizes the ribs before searing them on the grill. As such, ribs that are not sufficiently precooked must be grilled for a longer time which tends to make the ribs dry and tough. On the other hand, ribs that are adequately precooked become tenderized so that they tend to fall apart and separate during the cooking, turning and removal process. This is undesirable as the ribs tend to separate unevenly, and many rib aficionados prefer to have their ribs served as a whole or half rack/slab.

Therefore, it is an object of this invention to provide a barbecue tool that will firmly hold together a slab of ribs during grilling. It is a further object of the invention that the tool is capable of properly holding precooked and tenderized ribs during the grilling process without separation. Another object of the invention is that the tool will not interfere with the barbecue grilling process, and will allow the ribs to be seasoned and basted with barbecue sauce without removing them from the holding tool. Additional objects of the invention are that the tool can be readily cleaned and that it is economical to manufacture. Other objects of the invention will become apparent to one skilled in the art upon reading the following summary of invention and detailed description.

SUMMARY OF THE INVENTION

In one embodiment of the invention, a barbecue cooking tool with a pair of hand holdable implements is provided. The implements are configured so as to be capable to firmly hold an entire rack of ribs therebetween during a barbecue grilling process without the ribs separating and falling apart. The tool includes a clasping mechanism for holding the implements together about the ribs.

In one embodiment the implements of the barbecue cooking tool are separable from one another during normal use.

In an embodiment shown, the barbecue cooking tool includes a first implement and an second implement. Both of the implements have spaced apart rods. A further feature of this embodiment is that the spaced apart rods of the first implement are connected by a connecting rod at one end and by a raised portion on the other end. The spaced rods of the second implement are connected by rounded portions at both ends thereof.

In one embodiment of the invention, the clasping mechanism consists of one rounded end of the second implement inserted beneath the raised portion of the first implement. The other end of the second implement maybe inserted beneath the connecting rod of the first implement as the implements are being forced by a food item therebetween.

Also, in an embodiment of the invention, the spaced apart rods of the first implement are parallel to one another, and the spaced apart rods of the second implement are parallel to one another.

Another feature in one embodiment of the invention is that the raised portion of the first implement includes a pair of posts. One post is connected to each of the spaced apart rods of the first implement. The posts are connected by a second connecting rod.

A feature of the embodiment shown is that the implements permit access to the surface area of a food item held therebetween.

In one embodiment, the rods of one implement are spaced apart farther than the rods of the other implement. Also, one implement is longer than the other implement.

Other features of the invention will become apparent upon reading the detailed description. The above features should not be read as limiting the scope of the invention which is defined by the appended claims.

BRIEF DESCRIPTION OF THE DRAWINGS

FIG. 4 is a perspective view showing the slab of ribs clasped between the implements.

FIG. 5 is an end view as shown in FIG. 4 of the implements clasping the slab of ribs.

DETAILED DESCRIPTION OF THE PREFERRED EMBODIMENT

Figure 1:
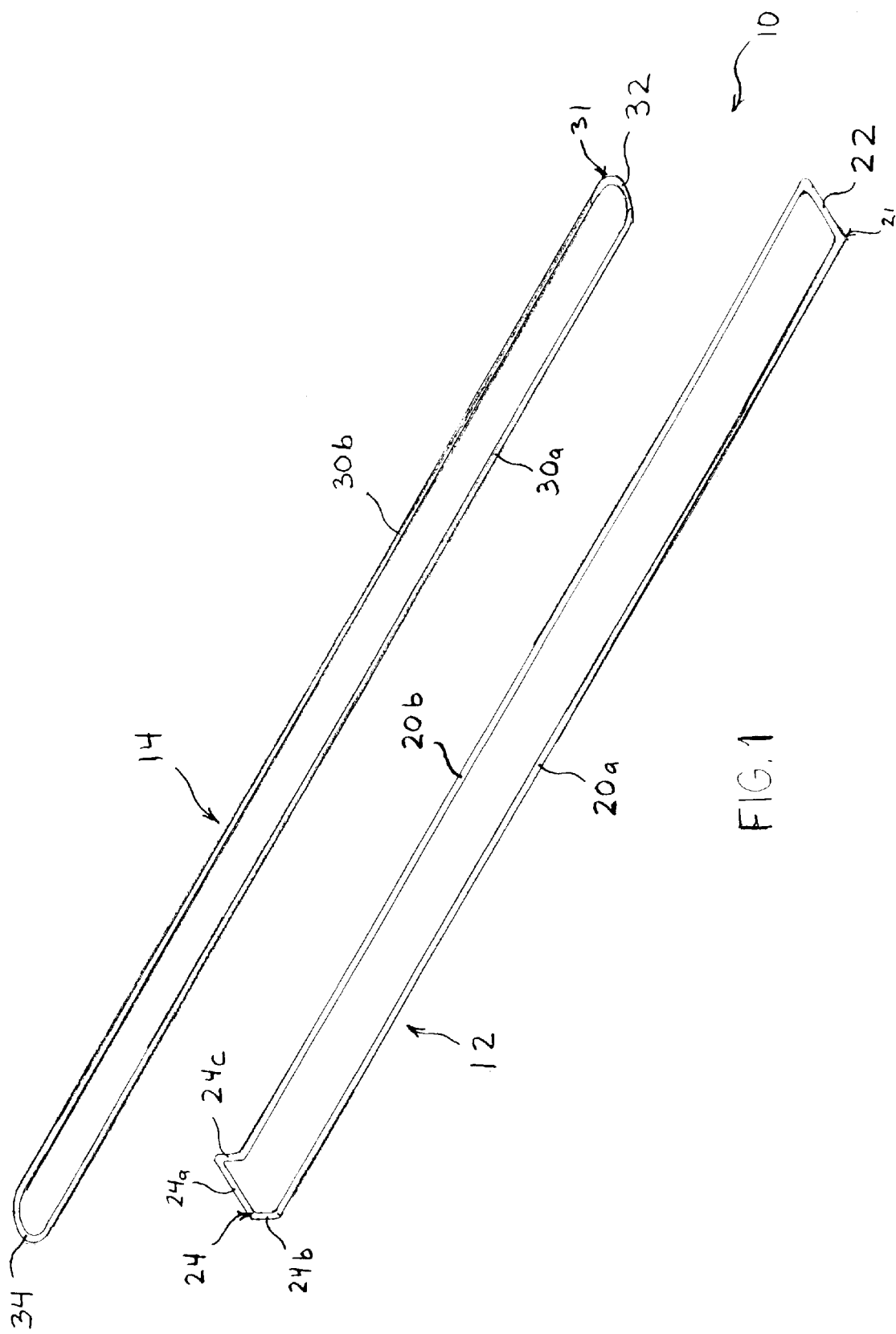
FIG. 1 is a perspective view of one embodiment of a barbecue tool of the present invention showing implements of the tool separated from one another.

In FIG. 1, a barbecue cooking tool or tongs are shown generally indicated as 10. Barbecue tool 10 includes a first implement generally indicated as 12 and a second implement generally indicated as 14.

In one embodiment, first implement 12 includes two generally parallel and spaced rods 20a, 20b. The rods are connected and held apart in a spaced arrangement at the rear end generally indicated as 21 by a transverse or connecting rod 22 and connected at the forward end by raised portion 24. Raised portion 24 includes a transverse or connecting rod 24a and upright posts 24b, 24c. The upright posts 24b, 24c are attached generally perpendicular to parallel rods 20a, 20b, respectively, and upright posts 24b, 24c are bridged by the transverse rod 24a.

As with first implement 12, second implement 14 includes two rods 30a, 30b extending generally parallel to and spaced apart from one another. Rods 30a, 30b are joined at the rear or aft end generally indicated as 31 by a rounded portion 32 and at the forward or fore end by a rounded portion 34.

It should be noted that in one embodiment, second implement 14 is longer than first implement 12 and parallel rods 30a, 30b are spaced more narrowly than parallel rods 20a and 20b for reasons that will become evident in the following description relating to the use and operation of barbecue tool 10. First implement 12 and second implement 14 are preferably made from a carbon steel or corrosion and heat resistant material such as stainless steel, aluminum or brass. The thickness of the rods should be sufficient to firmly hold a slab of ribs or other food items to be barbecued, yet thin enough to allow some flexibility. In one embodiment, ¼ inch diameter steel rods are utilized, and first implement 12 is approximately 33 inches long, while second implement 14 is approximately 35 inches long. The implements are manufactured by cutting, bending, and welding/braising or otherwise suitably joining sections of the rod together into the configuration shown using well known methods.

Figure 2:
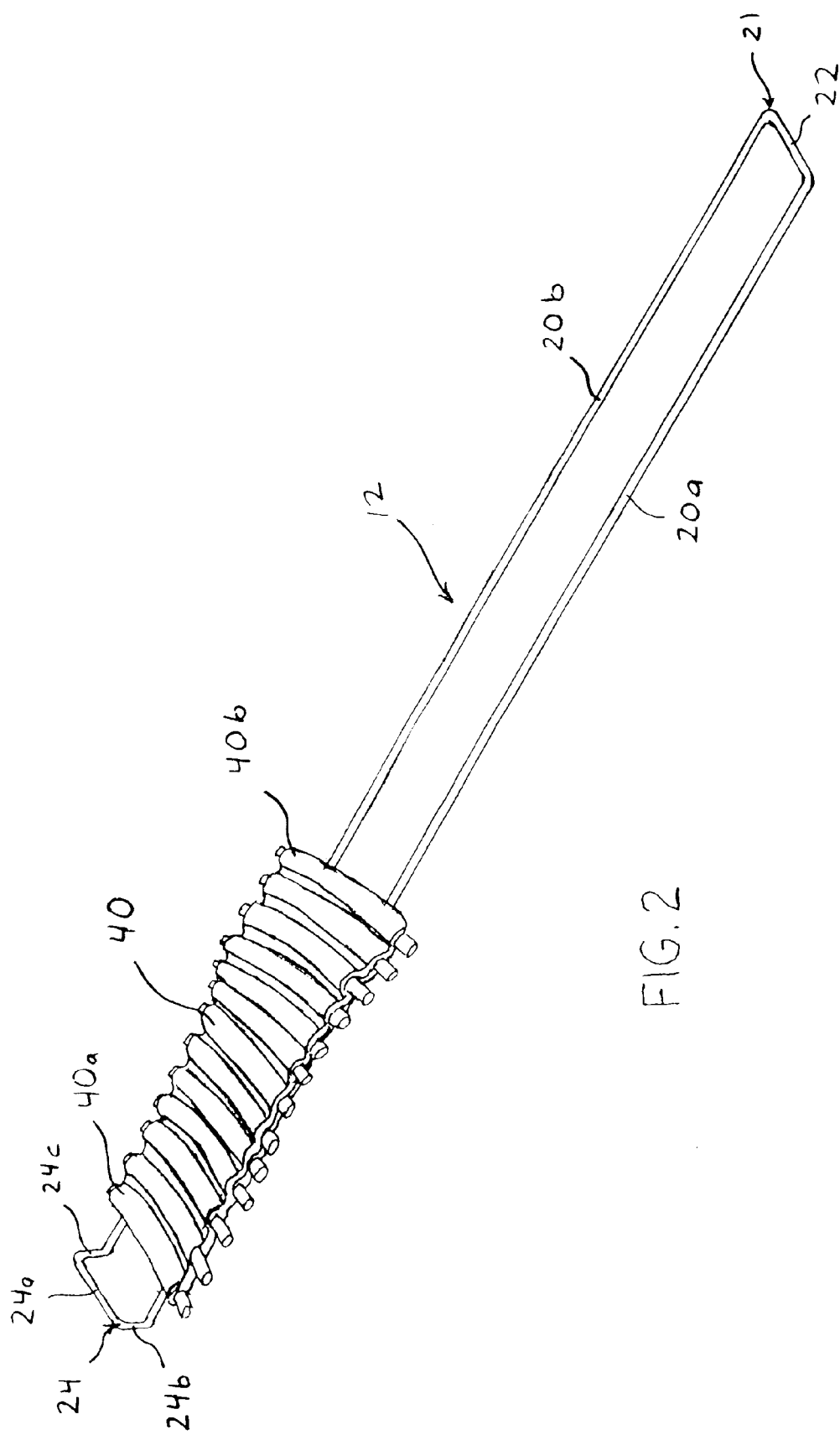
FIG. 2 is a perspective view showing a slab of ribs placed on one implement.

Now referring to FIG. 2, a rack of ribs 40 is shown being loaded onto first implement 12 of barbecue cooking tool 10. As is typical, rack of ribs 40 has a narrower end 40a and a wider end 40b. The design of the cooking tool is constructed to take advantage of the physical properties and configuration of a rack of ribs in order to firmly hold it during the barbecuing/grilling process. In order to take advantage of the physical properties and configuration of the rack of ribs, it should be properly loaded on the cooking tool. In one method, the loading operation is initiated by placing the first implement 12 on a surface with the raised portion 24 facing upward. The rack of ribs 40 is then laid on the first implement 12 near the raised portion 24. The rack of ribs 40 should be placed such that narrower end 40a is closest to raised portion 24, and wider end 40b is towards the transverse rear end rod 22. Also, as is best shown in FIG. 5, most rib racks have a generally bowed contour and the ribs should be placed such that the bow is concaved upward. Loading the ribs in this manner assures that barbecue tool 10 will be able to properly clasp the ribs in a stable manner.

Figure 3:
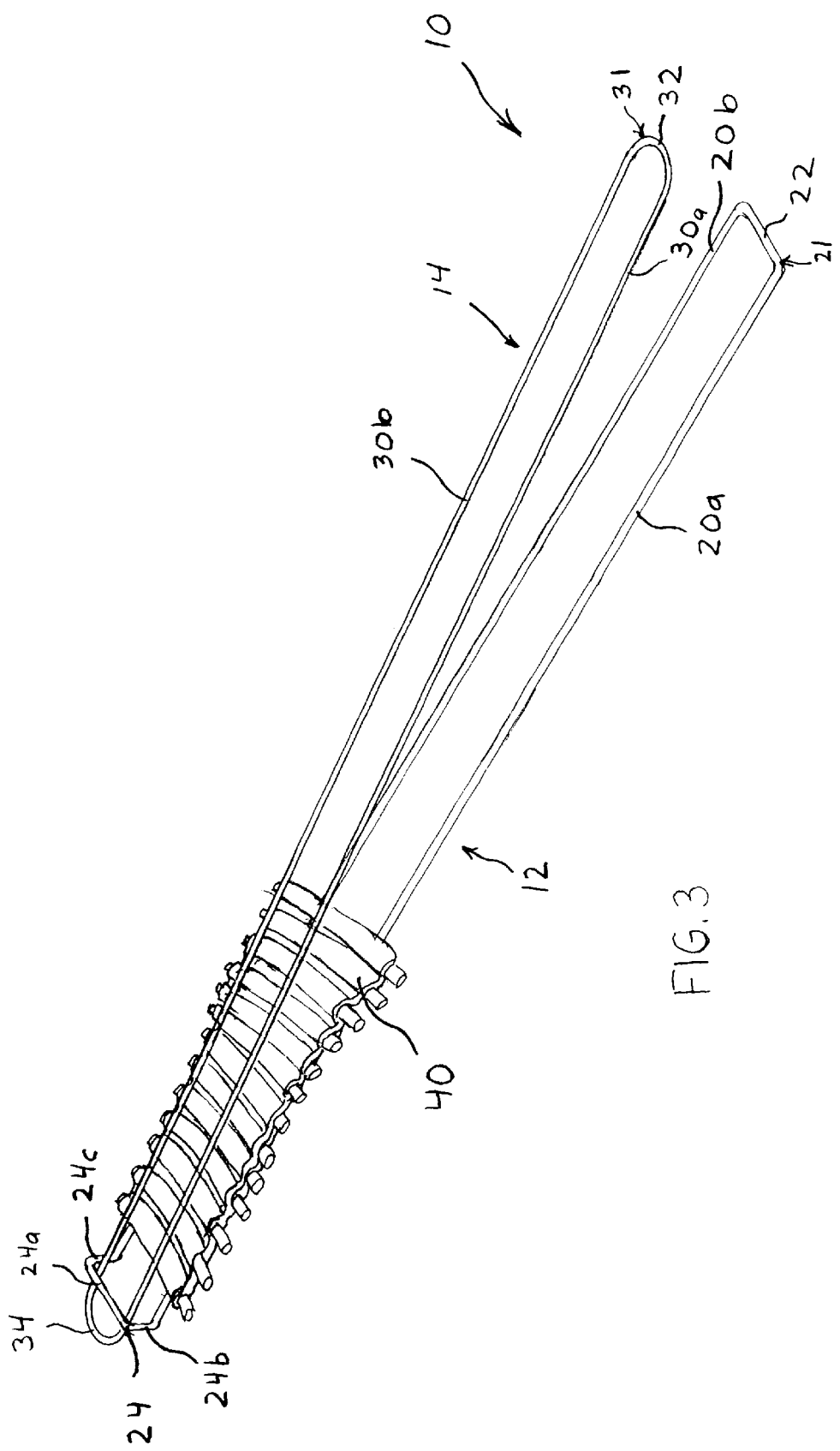
FIG. 3 is a perspective view showing another implement being inserted into the first implement for grasping the slab of ribs.

Next, as illustrated in FIG. 3, the implements are clasped or held together as the forward rounded portion of second implement 14 is inserted beneath the transverse rod 24a of raised portion 24 such that parallel rods 30a, 30b of implement 14 overlay the rack of ribs 40. As noted above, implement 14 is narrower than implement 12, therefore, parallel rods 30a, 30b fit between upright posts 24b, 24c of implement 12. In this position, second implement 14 may be pivoted upward or downward over the ribs with transverse rod 24a serving as the pivot point. When second implement 14 is pivoted downward, barbecue cooking tool 10 may be used by grasping implements 12 and 14 towards the rear ends 21 and 31, respectively, and squeezing them together to hold, move, cook, and flip the rack of ribs.

Implements 12 and 14 may be further held, latched, or clasped together as shown in FIG. 4 by first sliding second implement 14 forward so that rear rounded end portion 32 is forward of transverse rod 22, and then pulling rounded end portion 32 beneath the rear transverse rod 22 of first implement 12. As second implement 14 is longer than first implement 12, the forward rounded portion 34 of second implement 14 can still extend beyond transverse rod 24a of the first implement 12 while rear rounded end portion 32 is beneath transverse rod 22. Of course, care should be taken not to pull round end portion 32 too far past transverse rod 22 during the clamping and latching operation as rounded end 34 may slip beyond transverse rod 24a, thereby, prematurely releasing the rack of ribs 40. In the clamped or latched position of FIG. 4, implements 12 and 14 are flexed about the rack of ribs 40 thereby creating a holding force to wedge second implement 14 against transverse rods 22 and 24a so as to firmly hold the ribs therebetween. With the ribs clasped in this position, implements 12 and 14 provide a holding pressure along both sides of the entire rack of ribs 40. This eliminates separation or falling apart of the ribs during the cooking/grilling and turning process.

The unique design of the barbecue cooking tool 10 allows the rack of ribs to be firmly held, yet keeps most of the surface area exposed for cooking, searing, and basting. Another advantage of the present invention is that the metal rods slightly separate the ribs from the grill thereby reducing clean up of the grill and eliminating separation of meat that often results from the meat adhering to the grill when in intimate contact. This separation also helps prevent scorching of the ribs that can result from excessive, direct contact with the grill. It should also be noted that the length of implements 12 and 14 should be long enough to extend beyond the edge of the grill so that they may be easily grasped without burning the hand of the cook.

It should also be readily apparent from the above description that as the ribs are flipped/turned over during the barbecuing/grilling process second implement 14 would then be beneath the rack of ribs 40 while first implement 12 would be above said ribs.

When the barbecuing process has been completed, the rack of ribs 40 can then be moved to a serving plate or tray using barbecue tool 10. One easy way of unloading the ribs is to place barbecue tool 10 with second implement 14 beneath the ribs and overtop of a serving plate/tray. Then, rear rounded portion 32 is grasped and pulled until implement 14 has been pulled beyond the rack of ribs leaving them placed directly on the plate. The material and the design of the barbecue tool 10 allows for easy and ready clean up when done.

While the invention has been taught with specific reference to the embodiment described above, one skilled in the art will recognize that changes can be made in form and detail without departing from the spirit and scope of the invention. For example, the rods need not be parallel and could be manufactured so that they are narrower at the front raised portion 24 and forward rounded portion 34 and wider towards the rear ends 21 and 31. This will not change the operability of the barbecue tool but would provide increased stability towards the wider end 40b of the rack of ribs. Also, the shape of transverse rods 22 and 24a and that of rounded end portions 32 and 34 may be varied to any suitable configuration and need not be circular in cross section or perpendicular to rods 20a, 20b. The design of the preferred embodiment, however, allows the rounded portions 32 and 34 to slide freely past transverse rods 22 and 24a without getting caught or snagged. It should also be realized that the implements could be made such that either one or both have only one rod. For instance, first implement 12 could be a single rod having looped ends for the second rod to fit therethrough; however, the dual rods shown in the present invention provide greater stability and holding power than a single rod to prevent the ribs from twisting or falling out of the barbecue tool. Also, more than two rods could be used for either one or both implements or a wide bar could be substituted. The wide bar could include apertures to facilitate the cooking and basting of the ribs. It would also be possible to have a raised portion on both ends of the first implement or to have a raised portion on the second implement opposite the raised portion on the first implement.

Other clamping or latching means could also be utilized with the present invention. For instance, the implements could be hinged together at the front end with a latch at the rear end. Also, a pivoting hook could be used at the fore end of one implement to hook over and pivot about a transverse rod of the opposing implement. Furthermore, although the invention was designed to be ideal for cooking a rack of ribs, it will be apparent to one skilled in the art that the present invention can also be readily used for other food items including, but not limited to, chicken halves, chicken breasts, fish fillets, or steaks. Other materials may also be substituted for making the implements as long as the material possesses the appropriate strength, flexibility and resistance to heat as required for the invention. The cross section of the rods do not have to be round as square, hexagonal or other rod shapes may be substituted. Obviously, other lengths and diameters of rods may also be used. One skilled in the art will also recognize that other changes may also be made within the scope of the invention. As such, the described embodiments are to be considered in all respects as only illustrative and not restrictive. The scope of the invention is, therefore, indicated by the following claims rather than by the description.

What is claimed is:

1. A barbecue cooking tool comprising first and second hand holdable implements, said implements including spaced apart rods configured so as to be capable to firmly hold an entire rack of ribs therebetween during a barbecue grilling process without the ribs separating and falling apart, and a clasping mechanism for holding said implements together about the ribs, said spaced apart rods of said first implement being connected by a connecting rod at one end and by a raised portion on the other end.

2. The barbecue cooking tool as set forth in claim 1, wherein said implements are separable from one another during the normal use of said barbecue cooking tool.

3. The barbecue cooking tool as set forth in claim 1, wherein said spaced rods of said second implement are connected by rounded portions at both ends thereof.

4. The barbecue cooking tool as set forth in claim 3, wherein said clasping mechanism includes one rounded end of said second implement inserted beneath said raised portion of the first implement.

5. The barbecue cooking tool as set forth in claim 1, wherein said clasping mechanism can lock said implements in a flexed position about the entire length of the rack of ribs to firmly hold the rack.

6. The barbecue cooking tool as set forth in claim 1, wherein said spaced apart rods of said first implement are parallel to one another, and said spaced apart rods of said second implement are parallel to one another.

7. The barbecue cooking tool as set forth in claim 1, wherein said raised portion of said first implement includes a pair of posts, one connected to each of said spaced apart rods of said first implement, said posts being connected by a second connecting rod.

8. The barbecue cooking tool as set forth in claim 1, wherein said implements permit access to the surface area of a food item held therebetween.

9. A barbecue cooking tool comprising a pair of implements configured and capable of holding an entire rack of ribs, wherein said implements are separable from one another during the normal course of using said barbecue cooking tool, a clasping mechanism for holding said tool firmly about the rack of ribs without the ribs separating or tearing apart during the cooking process, said clasping mechanism including one end of one implement wedged against one end of the other implement, and the other end of said one implement wedged against the other end of said other implement as forced by a food item between said implements.

10. The barbecue cooking tool as set forth in claim 9, wherein said pair of implements includes a first implement having a pair of spaced apart rods, and a second implement also having a pair of spaced apart rods.

11. The barbecue cooking tool as set forth in claim 10, wherein said rods of the first implement are connected at one end thereof by a raised portion.

12. The barbecue cooking tool as set forth in claim 10, wherein said spaced apart rods of at least one of said first or second implements are parallel to one another.

13. A barbecue cooking tool comprising a pair of implements configured and capable of holding an entire rack of ribs during a barbecue cooking process, and said implements configured to have a length that extends transverse to bones of the ribs to be cooked, and one of said implements configured with a width that is narrower then the ends of the ribs to be cooked, said one implement designed to engage the ribs on a concave side thereof, said pair of implements being completely separable from one another during the normal use of said barbecue cooking tool, and both of said implements having spaced apart rods and said rods of one implement are spaced apart farther than said rods of the other implement.

14. The barbecue cooking tool as set forth in claim 13, wherein one implement is longer than the other implement.

15. The barbecue cooking tool as set forth in claim 13, wherein said implements include a clasping mechanism.

16. The barbecue cooking tool as set forth in claim 15, wherein said clasping mechanism includes an end of one implement wedged under an end of the other implement.

17. The barbecue cooking tool as set forth in claim 16, wherein said clasping mechanism further includes the other end of said one implement wedged beneath the other end of said other implement as said implements are being forced by a food item held therebetween.

18. A barbecue cooking tool comprising a pair of implements configured and capable of holding an entire rack of ribs during a barbecue cooking process, said implements configured to have a length that extends transverse to bones of the ribs to be cooked, and at least one of said implements configured to have a width that is narrower than the widest width of the bones of the ribs to be cooked, and said implements further designed to clasp the ribs on opposite sides thereof along the length, said one implement having a pair of spaced apart rods connected by two ends and said other implement includes a pair of spaced apart rods connected at one end by a transverse rod and at the other end by a transverse raised portion.

19. The barbecue cooking tool as set forth in claim 18 wherein at least one of said implements comprises a pair of spaced apart rods.

\* \* \* \* \*

UNITED STATES PATENT AND TRADEMARK OFFICE
CERTIFICATE OF CORRECTION

PATENT NO.     : 6,553,898 B2
DATED          : April 29, 2003
INVENTOR(S)    : John Folkertsma It is certified that error appears in the above-identified patent and that said Letters Patent is hereby corrected as shown below:

<u>Column 7,</u>
Line 2, "then" should be -- than --

Signed and Sealed this

Eighth Day of July, 2003

JAMES E. ROGAN
*Director of the United States Patent and Trademark Office*